United States Patent
Xiong (10) Patent No.: US 11,991,066 B2
(45) Date of Patent: May 21, 2024

(54) METHOD OF ESTABLISHING BIDIRECTIONAL FORWARDING DETECTION SESSION BASED ON BIER, AND BFIR, BFER, SYSTEM AND STORAGE MEDIUM

(71) Applicant: ZTE CORPORATION, Guangdong (CN)

(72) Inventor: Quan Xiong, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 366 days.

(21) Appl. No.: 17/433,640

(22) PCT Filed: Feb. 18, 2020

(86) PCT No.: PCT/CN2020/075708
§ 371 (c)(1),
(2) Date: Aug. 25, 2021

(87) PCT Pub. No.: WO2020/173340
PCT Pub. Date: Sep. 3, 2020

(65) Prior Publication Data
US 2022/0150155 A1    May 12, 2022

(30) Foreign Application Priority Data
Feb. 26, 2019 (CN) ......................... 201910142615.0

(51) Int. Cl.
*H04L 45/02* (2022.01)
*H04L 45/00* (2022.01)
(Continued)

(52) U.S. Cl.
CPC ............ *H04L 45/04* (2013.01); *H04L 45/026* (2013.01); *H04L 45/16* (2013.01); *H04L 45/32* (2013.01); *H04L 45/745* (2013.01)

(58) Field of Classification Search
CPC ....... H04L 45/741; H04L 12/46; H04L 45/16; H04L 47/125; H04L 45/02; H04L 45/745
See application file for complete search history.

(56) References Cited

U.S. PATENT DOCUMENTS

| 10,313,216 B2 | 6/2019 | Zheng et al. |
| 2009/0010153 A1 | 1/2009 | Filsfils et al. |

(Continued)

FOREIGN PATENT DOCUMENTS

| CN | 101035057 A | 9/2007 |
| CN | 101160855 A | 4/2008 |

(Continued)

OTHER PUBLICATIONS

WIPO, International Search Report dated Apr. 29, 2020.
(Continued)

*Primary Examiner* — Iqbal Zaidi
(74) *Attorney, Agent, or Firm* — Li & Cai Intellectual Property (USA) Office (57) ABSTRACT

Embodiments of the invention relate to the field of the multicast network. Disclosed by the embodiments of the present invention are a method of establishing a bidirectional forwarding detection (BFD) session based on bit index explicit replication (BIER), a BFIR, a BFER, a system and a storage medium. A method includes: establishing, by a bit-forwarding ingress router (BFIR), the BFD session; flooding, by the BFIR, BFD information to a bit-forwarding egress router (BFER) group based on an Interior Gateway Protocol (IGP); and transmitting, by the BFIR, a BFD control packet to a BFER, to trigger the BFER to establish the BFD session corresponding to the BFIR.

20 Claims, 7 Drawing Sheets

(51) Int. Cl.
*H04L 45/16* (2022.01)
*H04L 45/745* (2022.01)

(56) References Cited

U.S. PATENT DOCUMENTS

| | | | |
|---|---|---|---|
| 2009/0046723 | A1 | 2/2009 | Rahman |
| 2011/0164494 | A1 | 7/2011 | Kalyanjeet |
| 2013/0070764 | A1 | 3/2013 | Boutros et al. |
| 2016/0254991 | A1* | 9/2016 | Eckert ................ H04L 12/4633 370/225 |
| 2020/0389385 | A1* | 12/2020 | Nainar .................... H04L 43/50 |
| 2021/0014174 | A1* | 1/2021 | Xia ...................... H04L 12/4633 |

FOREIGN PATENT DOCUMENTS

| | | |
|---|---|---|
| CN | 102546304 A | 7/2012 |
| CN | 102571601 A | 7/2012 |
| CN | 102594600 A | 7/2012 |
| CN | 103703722 A | 4/2014 |
| CN | 104270309 A | 1/2015 |
| CN | 104270367 A | 1/2015 |
| CN | 105812197 A | 7/2016 |
| CN | 106656524 A | 5/2017 |
| CN | 107135151 A | 9/2017 |
| CN | 108449276 A | 8/2018 |
| CN | 108964940 A | 12/2018 |
| CN | 109150659 A | 1/2019 |
| EP | 3422643 A1 | 1/2019 |

OTHER PUBLICATIONS

China Patent Office, First Office Action dated Apr. 12, 2022 for application No. CN201910142615.0.
Xin Gao:"Analysis of bidirectional forwarding detection", Master's Thesis, Beijing Uniersity of Posts And Telecommunications, Mar. 15, 2007.
D. Katz, et al., "BFD for Multipoint Networks", Internet Engineering Task Force, Dec. 13, 2018.
G. Mirsky, et al.:"Bidirectional forwarding detection (BFD) for multi-point networks and protocol independent multicast-sparse mode (PIM-SM) use case", PIM Working Group, Internet—Draft, Oct. 22, 2018.
D. Katz, et al.:"Bidirectional forwarding detection (BFD)", Internet Engineering Task Force (IETF), Jun. 30, 2010.
L. Ginsberg, et al.:"Bit index explicit replication (BIER) support via IS-IS", Internet Engineering Task Force (IETF), Jun. 30, 2018.
IJ. Wijnands, et al.:"Encapsulation for bit index explicit replication (BIER) in MPLS and Non-MPLS Networks", Internet Engineering Task Force (IETF), Jan. 31, 2018.
China Patent Office, Second Office Action dated Nov. 2, 2022 for application No. CN201910142615.0.
D. Katz et al.:"BFD for multipoint network; draft-ietf-bfd-multipoint-19", Internet—Draft: Internet Engineering Task Force, IETF, Dec. 13, 2018.
Fangwei Hu et al.:"BIER BFD; draft-hu-bier-bfd-02. txt", Oct. 11, 2018.
C. Hopps et al:"IS-IS BFD Enabled TLV; draft-ietf-isis-bfd-tlv-00", Internet Engineering Task Force, IETF, Mar. 10, 2008.
European Patent Office, The extended European search report dated Sep. 23, 2022 for application No. EP20763509.5.
Katz Juniper Networks D Ward Cisco Systems S Pallagatt D et al:"BFD for multipoint network; draft-ietf-bfd-multipoint-18. txt", Internet—Draft: Internet Engineering Task Force, IETF,Jun. 18, 2018.
Katz Juniper Networks D Ward Cisco Systems S Pallagatt D et al:"BFD multipoint active tails .; draft-ietf-bfd-multipoint-active-tail-09. txt", Internet—Draft: Internet Engineering Task Force, IETF,Jun. 18, 2018.
Ginsberg L et al:"Bit index explicit replication (BIER) support via IS-IS; rfc8401. txt", Internet Engineering Task Force, IETF,Jun. 7, 2018.
Hopps L Ginsberg Cisco Systems C:"IS-IS BFD-Enabled TLV; rfc6213. txt", Internet Engineering Task Force, IETF,Apr. 21, 2011.
Quan Xiong Fangwei Hu Greg Mirsky ZTE Corporation:"The resilience for BIER; draft-xiong-bier-resilience-01. txt", Internet Engineering Task Force, IETF,Oct. 13, 2018.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|   Type (TBD1)  |  Length (variable) |
+-+-+-+-+-+-+-+-+-+-+-+-+-+-+-+-+-+-+-+-+-+-+-+-+-+-+-+-+-+-+-+-+
|                         Discriminator                         |
+-+-+-+-+-+-+-+-+-+-+-+-+-+-+-+-+-+-+-+-+-+-+-+-+-+-+-+-+-+-+-+-+
|      RESERVED         |              BIFT-id                  |
+-+-+-+-+-+-+-+-+-+-+-+-+-+-+-+-+-+-+-+-+-+-+-+-+-+-+-+-+-+-+-+-+
|                   BitString (first 32 bits)                  ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString (last 32 bits)                    |
+-+-+-+-+-+-+-+-+-+-+-+-+-+-+-+-+-+-+-+-+-+-+-+-+-+-+-+-+-+-+-+-+
```

Fig. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type (TBD2)            |      Length (variable)        |
+-+-+-+-+-+-+-+-+-+-+-+-+-+-+-+-+-+-+-+-+-+-+-+-+-+-+-+-+-+-+-+-+
|                         Discriminator                         |
+-+-+-+-+-+-+-+-+-+-+-+-+-+-+-+-+-+-+-+-+-+-+-+-+-+-+-+-+-+-+-+-+
|       RESERVED        |              BIFT-id                  |
+-+-+-+-+-+-+-+-+-+-+-+-+-+-+-+-+-+-+-+-+-+-+-+-+-+-+-+-+-+-+-+-+
|                   BitString (first 32 bits)                  ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString (last 32 bits)                    |
+-+-+-+-+-+-+-+-+-+-+-+-+-+-+-+-+-+-+-+-+-+-+-+-+-+-+-+-+-+-+-+-+
```

METHOD OF ESTABLISHING BIDIRECTIONAL FORWARDING DETECTION SESSION BASED ON BIER, AND BFIR, BFER, SYSTEM AND STORAGE MEDIUM

CROSS-REFERENCE TO RELATED APPLICATIONS

The present application is a National Stage of International Application No. PCT/CN2020/075708, filed Feb. 18, 2020, which claims priority from the Chinese patent application No. 201910142615.0 filed with the China Patent Office on Feb. 26, 2019, both of which are incorporated in the present application by reference in their entireties.

The present application claims priority from the Chinese patent application No. 201910142615.0 filed with the China Patent Office on Feb. 26, 2019, the contents of which are incorporated in the present application by reference in entire.

TECHNICAL FIELD

Embodiments of the invention relate to, but are not limited to, the field of a multicast network, and more specifically relate to a method of establishing a bidirectional forwarding detection (BFD) session based on bit index explicit replication (BIER), and a bit-forwarding ingress router (BFIR), a bit-forwarding egress router (BFER), a system and a storage medium.

BACKGROUND

An Internet Protocol (IP) multicast technology implements efficient point-to-multi-point data transmission in an IP network, which can effectively save a bandwidth of the network and reduce a load of the network. Therefore, the IP multicast technology is widely used in real-time data transmission, multimedia conference, data copy, IP Television (IPTV), games and simulation, etc. The multicast technology is generally implemented by using a Protocol Independent Multicast (PIM) protocol (including a Protocol Independent Multicast-Sparse Mode (PIM-SM), a Protocol Independent Multicast-Dense Mode (PIM-DM)) and a Multicast Source Discovery Protocol (MSDP), etc. A common feature of these multicast protocols is to construct a control plane multicast tree, which is used for logically transforming a network plane into a tree, so as to realize point-to-multipoint data forwarding and loop avoidance of multicast forwarding. Intermediate nodes of these multicast routing protocols, which take construction of multicast distribution tree as a core, are required to maintain states of complex multicast forwarding information. With an increasing scale of the network and an increasing traffic of multicast data, this multicast technology is faced with more and more challenges in costs, operation and maintenance. Therefore, a new technology called BIER (bit indexed explicit replication) technology is proposed for constructing a multicast forwarding path.

During packet forwarding, a service may be interrupted due to a device fault. To ensure normal forwarding of a BIER packet, reduce an impact of the device fault on the service, and improve availability of a network, a bit-forwarding router (BFR) node in a BIER network must be able to detect a communication fault with the device as soon as possible, so that measures can be taken in time to ensure that the service can be continued. A BFD mechanism provides a unified detection mechanism for the entire network. It can be used for detecting a fault between two forwarding points. This mechanism enables fast link detection and ensures continuity of the service.

Therefore, for the BIER network, it is necessary to provide a scheme that can realize the BFD.

SUMMARY

Embodiments of the present invention provide a method of establishing a BFD session based on BIER, including: establishing, by a BFIR, the BFD session; flooding, by the BFIR, BFD information to a BFER group based on an Interior Gateway Protocol (IGP); and transmitting, by the BFIR, a BFD control packet to a BFER, to trigger the BFER to establish the BFD session corresponding to the BFIR.

The embodiments of the present invention further provide a method of establishing a BFD session based on BIER, including: receiving, by a BFER, BFD information flooded by a BFIR based on an IGP, and storing the BFD information; and establishing, by the BFER, the BFD session corresponding to the BFIR according to a BFD control packet and the BFD information, after receiving the BFD control packet transmitted by the BFIR.

The embodiments of the present invention further provide a BFIR, including: an establishing unit, configured to establish a BFD session, a flooding unit, configured to flood BFD information to a BFER group based on an IGP, and a transmitting unit, configured to transmit a BFD control packet to a BFER, to trigger the BFER to establish the BFD session corresponding to the BFIR.

The embodiments of the present invention further provide a BFER, including: a receiving unit, configured to receive BFD information flooded by a BFIR based on an IGP; a storing unit, configured to store the BFD information; and an establishing unit, configured to establish the BFD session corresponding to the BFIR according to a BFD control packet and the BFD information, after receiving the BFD control packet transmitted by the BFIR.

The embodiments of the present invention further provide a system of establishing a BFD session based on BIER, including: a BFIR and a BFER; the BIER, configured to establish the BFD session, flood BFD information to a BFER group based on an IIGP, and transmit a BFD control packet to the BFER; and the BFER, configured to receive the BFD information flooded by the BFIR based on the IGP, store the BFD information, and establish the BFD session corresponding to the BFIR according to the BFD control packet and the BFD information, after receiving the BFD control packet transmitted by the BFIR.

The embodiments of the present invention further provide a BFIR, including a memory, a processor and a computer program stored on the memory and capable of being executed by the processor. When the computer program is executed by the processor, the method of establishing the BFD session executed by the BFIR is realized.

The embodiments of the present invention further provide a BFER, including a memory, a processor and a computer program stored on the memory and capable of being executed by the processor. When the computer program is executed by the processor, the method of establishing the BFD session executed by the BFER is realized.

The embodiments of the present invention further provide a computer-readable storage medium storing an information processing program thereon. When the information processing program is executed by a processor, any one of the above-mentioned methods of establishing the BFD session is realized.

Compared with related technologies, according to the technical schemes provided by the embodiments of the present invention, the IGP protocol is used to flood BIER BFD information to realize establishment of BIER BFD session, thereby realizing BFD of the BIER.

DETAILED DESCRIPTION

Embodiments of the present invention will be described in detail below with reference to the accompanying drawings. It should be noted that the embodiments of the present application and features therein may be combined with each other in any manner.

Steps shown in the flowcharts of the accompanying drawings may be executed in a computer system that executes computer-executable instructions. In addition, although logical sequences are shown in the flowcharts, in some cases, the steps shown or described may be performed in a sequence other than the sequences shown herein.

Figure 1:
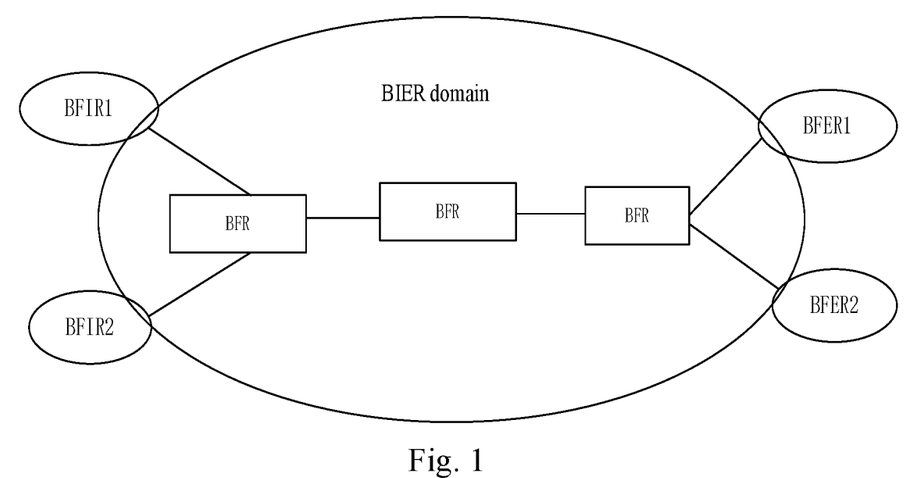
FIG. 1 is a schematic diagram of a BIER-based multicast architecture.

A BIER technology proposes a new multicast technology architecture that does not require construction of multicast distribution tree, as shown in FIG. 1. A router that supports the BIER technology is called a BFR, and a multicast forwarding domain composed of BFRs is called a BIER domain. At an edge of the BIER domain, a device that implements BFIR encapsulation of multicast data of a user is called a BFIR, and an edge BFR device that decapsulates a BIER data packet is called a BFER. After being BFIR encapsulated, the multicast data enters the BIER domain, and is forwarded in the BIER domain depending on a header of the BIER. In the BIER domain, each edge BFER is assigned a globally unique bit position, information of each BFER is flooded in the BIER domain by using an IGP, and all bit positions constitute a bit string. Transmission and routing of the data packet in the BIER domain depend on the bit string. After receiving a packet header containing the BIER, the BFR forwards the packet according to the bit string carried in the BIER packet header.

According to a BFD standard definition of RFC5880, a BFD session will be established between two detection points before link detection. Due to the BIER technology being used in a multicast service, a bidirectional detection method of point to multiple-point (P2MP) is needed. Although relevant proposals of the Internet Engineering Task Force (IETF) disclose a BFD related scheme of P2MP in a multicast scenario, they do not involve realizing BFD of the BIER in a control plane.

Figure 2:
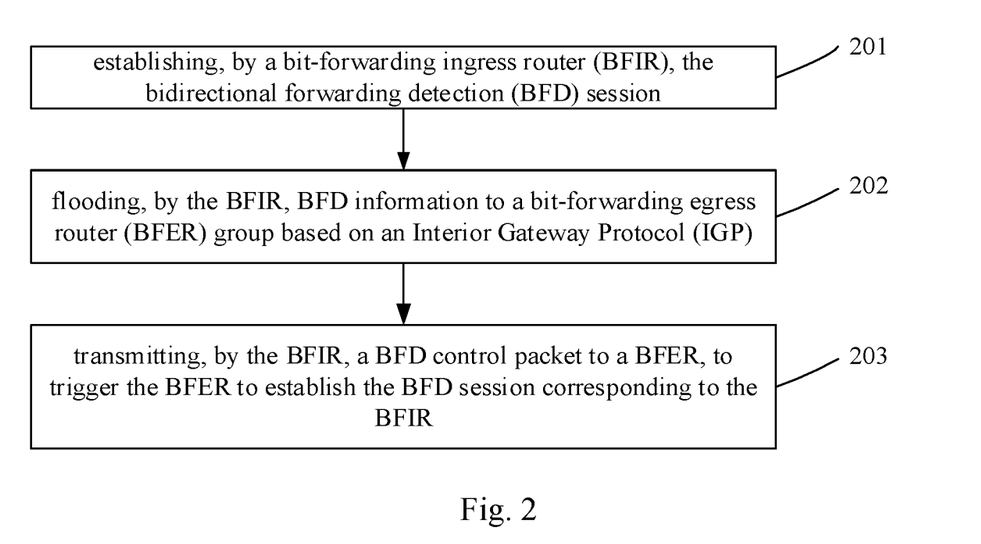
FIG. 2 is a flowchart of a method of establishing a BFD session based on BIER provided by an embodiment of the present invention.

An embodiment of the present invention provides a method of establishing a BFD session based on BIER, as shown in FIG. 2, and the method includes the followings.

In step 201, a BFD session is established by a BFIR.

In step 202, BFD information is flooded to a BFER group by the BFIR based on an IGP.

In step 203, a BFD control packet is transmitted to a BFER by the BFIR, to trigger the BFER to establish the BFD session corresponding to the BFIR.

The BFD information includes: a globally unique discriminator assigned by the BFIR to a multi-point path, and a BIER forwarding table identifier (BIFT-id) and a bit string to which the BFER group belongs.

The BFER group is one or more BFER nodes corresponding to the BIFT-id and the bit string in the BFD information.

The IGP includes one of an Intermediate System to Intermediate System (ISIS) protocol, and an Open Shortest Path First (OSPF) protocol.

When the IGP is the ISIS protocol, the BFIR flooding the BFD information based on the IGP includes: the BFD information is carried by the BFIR in a flooded message based on the ISIS protocol.

The flooded message is an Intermediate System to Intermediate System Hello (ISIS Hello) message, the ISIS Hello message carries a BIER BFD sub-TLV, and the BIER BFD sub-TLV carries the BFD information.

When the IGP is the OSPF protocol, the BFIR flooding the BFD information based on the IGP includes: the BFD information is carried by the BFIR in the flooded message based on the OSPF protocol.

The flooded message is an Open Shortest Path First Hello (OSPF Hello) message, the OSPF Hello message carries the BIER BFD sub-TLV, and the BIER BFD sub-TLV carries the BFD information.

The BIER BFD sub-TLV includes: a Discriminator field, used for representing the globally unique discriminator assigned by the BFIR to the multi-point path; a BIFT-id field, used for representing the BIFT-id to which the BFER group belongs; and a BitString field, used for representing the bit string formed by bit positions of the BFER group.

The BFD control packet carries node information of the BFIR and the globally unique discriminator assigned by the BFIR to the multi-point path.

Figure 3:
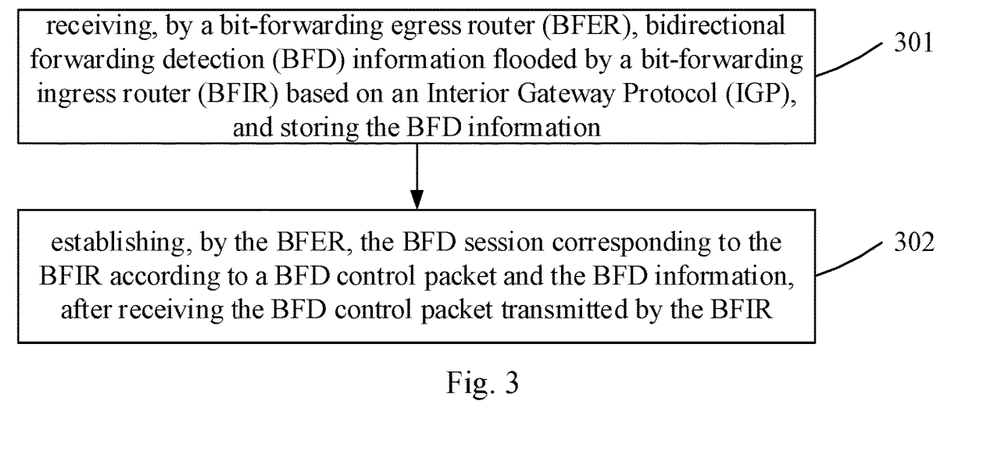
FIG. 3 is another flowchart of a method of establishing a BFD session based on BIER provided by an embodiment of the present invention.

As shown in FIG. 3, an embodiment of the present invention provides another method of establishing a BFD session based on BIER, and including the followings.

In step 301, BFD information flooded by a BFIR based on an IGP is received and stored by a BFER.

In step 302, a BFD session corresponding to the BFIR is established by the BFER according to a BFD control packet and the BFD information, after the BFD control packet transmitted by the BFIR is received by the BFIR.

The BFD information includes a globally unique discriminator assigned by the BFIR to a multi-point path, and a BIFT-id and a bit string to which a BFER group belongs.

Storing the BFD information includes: when the BFER determines that itself is a BFER node corresponding to the BIFT-id and the bit string in the BFD information, the BFD information is stored by the BFER.

The IGP includes one of an ISIS protocol, and an OSPF protocol.

When the IGP is the ISIS protocol, the BFER receiving the BFD information flooded by the BFIR based on the IGP includes: the BFD information carried by the BFIR in a flooded message based on the ISIS protocol is received by the BFER.

The flooded message is an ISIS Hello message, the ISIS Hello message carries a BIER BFD sub-TLV, and the BIER BFD sub-TLV carries the BFD information.

When the IGP is the OSPF protocol, the BFER receiving the BFD information flooded by the BFIR based on the IGP includes: the BFD information carried by the BFIR in the flooded message based on the OSPF protocol is received by the BFER.

The flooded message is an OSPF Hello message, the OSPF Hello message carries the BIER BFD sub-TLV, and the BIER BFD sub-TLV carries the BFD information.

The BIER BFD sub-TLV includes: a Discriminator field, used for representing the globally unique discriminator assigned by the BFIR to the multi-point path; a BIFT-id field, used for representing the BIFT-id to which the BFER group belongs; and a BitString field, used for representing the bit string formed by bit positions of the BFER group.

The BFD control packet carries node information of the BFIR and the globally unique discriminator assigned by the BFIR to the multi-point path.

Establishing the BFD session corresponding to the BFIR according to the BFD control packet and the BFD information includes: a BFER node parses the BFD control packet after receiving the BFD control packet; and when the node information of the BFIR and the discriminator carried in the BFD control packet are consistent with the stored BFD information, the BFD session corresponding to the BFER node is established.

Figure 4:
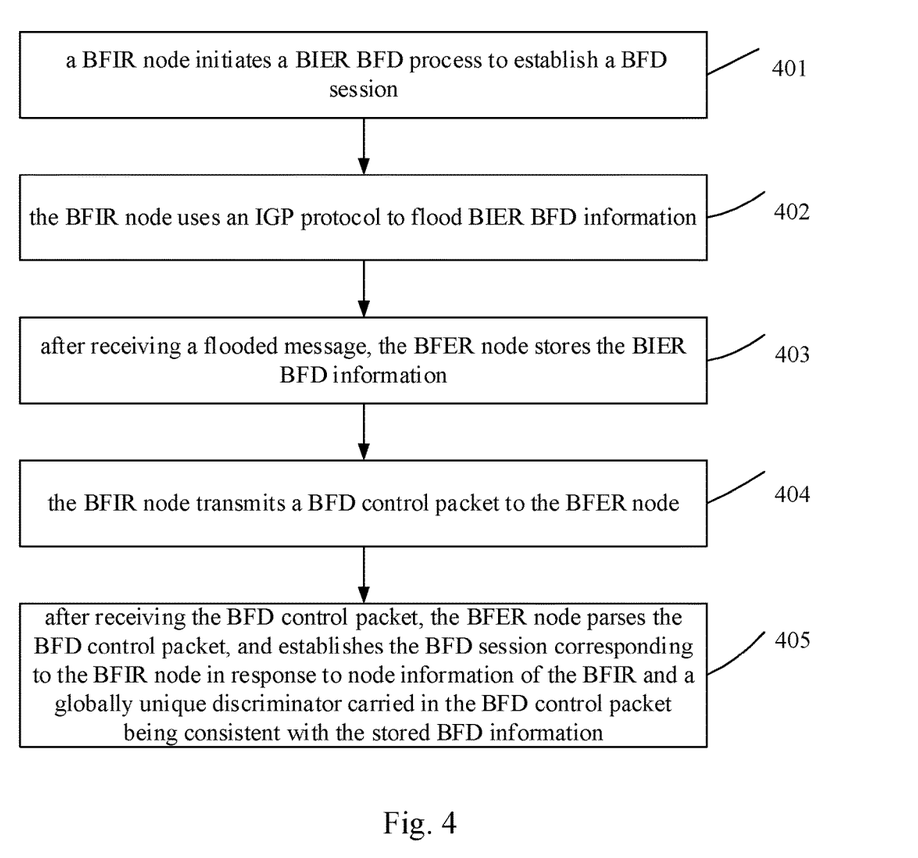
FIG. 4 is another flowchart of a method of establishing a BFD session based on BIER provided by an embodiment of the present invention.

An embodiment of the present invention provides another method of establishing a BFD session based on BIER. As shown in FIG. 4, the method includes the followings.

In step 401, a BFIR node initiates a BIER BFD process to establish a BFD session.

In step 402, the BFIR node uses an IGP protocol to flood BIER BFD information.

For example, an ISIS or OSPF protocol is used to flood the BIER BFD information. A flooded message may carry a BIER BFD sub-TLV, and parameters carried by the BIER BFD sub-TLV include a globally unique discriminator assigned by the BFIR to a multi-point path and a BIFT-id and a bit string to which a BFER group to be notified belongs.

To be specific, IGP-Traffic Engineering (IGP-TE) may be extended, and bootstrap information of the BIER BFD, i.e., BFD information may be notified based on an OSPF or ISIS protocol. The BFD information includes the globally unique discriminator assigned to the multi-point path by a first node of a BFIR network, and information of the BIFT-id and the bit string of a last node with which the first node expects to establish the BFD session and link detection. When the BIER BFD information is notified through the ISIS protocol to establish the BFD session, for example, a new BIER BFD sub-TLV may be carried in the flooded message, and the sub-TLV is used for carrying the BFD information. When the BIER BFD information is notified through the OSPF protocol to establish the BFD session, the new BIER BFD sub-TLV may be carried in the flooded message, and the sub-TLV is used for carrying the BFD information.

A purpose of flooding is to flood the BFD information to a BFER group. This BFER group is all BFERs (which are one or more BFERs) with which the BFIR expects to establish the BFD session.

In step 403, after receiving the flooded message, the BFER node stores the BIER BFD information.

It is may be determined by the BFER node whether itself is included in BFER nodes to be notified according to the BIFT-id and the bit string in the received BFD information. When it is determined that itself is included in the BFER nodes to be notified, and the BFER determines that itself is a BFER node corresponding to the BIFT-id and the bit string in the BFD information, the BFER node stores the received BFD information.

In step 404, the BFIR node transmits a BFD control packet to the BFER node.

The BFD control packet is a multi-point control packet, and the BFIR node may transmit the BFD control packet to all BFER nodes that are expected to establish the BFD session.

The control packet carries node information of the BFIR and the globally unique discriminator assigned by the BFIR to the multi-point path.

In step 405, after receiving the BFD control packet, the BFER node parses the BFD control packet, and establishes the BFD session corresponding to the BFIR node in response to the node information of the BFIR and the discriminator carried in the BFD control packet being consistent with the stored BFD information.

According to the technical scheme provided in this embodiment, the IGP protocol is used to flood the BFD information in the BIER network to realize the establishment of the BIER BFD session, thereby completing a BIER bidirectional path detection mechanism.

Figure 5:
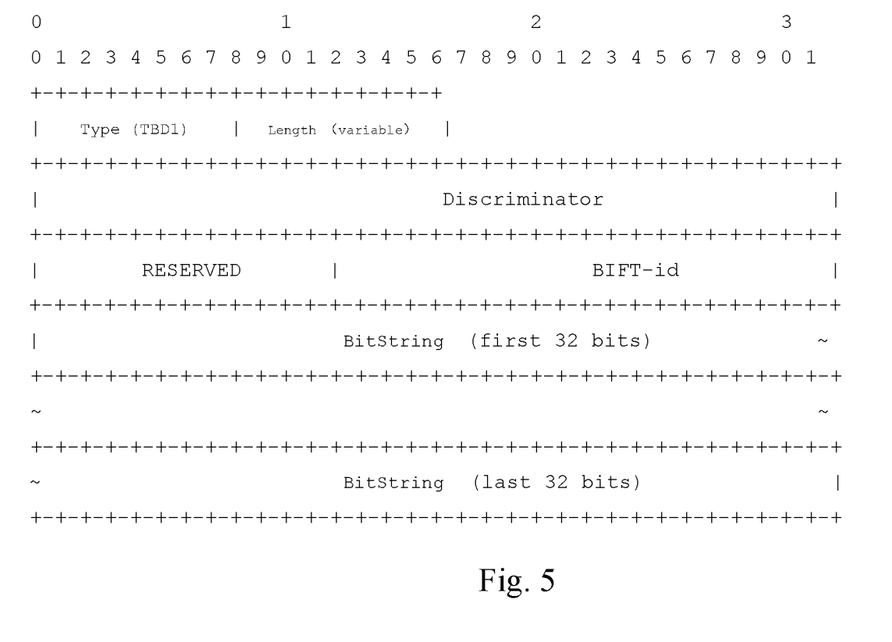
FIG. 5 is a schematic diagram of a format of a BIER BFD sub-type length value (sub-TLV) provided by an embodiment of the present invention.

An embodiment of the invention extends the ISIS protocol and provides a new BIER BFD sub-TLV used for carrying the BFD information, and a format of the BIER BFD sub-TLV is shown in FIG. 5.

Type: Type may be assigned a value TBD1 indicating that the TLV is a BIER BFD sub-TLV of the ISIS protocol, and may be 8 bits.

Length: Length indicates a length of the TLV, and may be 8 bits.

Discriminator: Discriminator indicates a globally unique discriminator assigned by a BFIR to a multi-point path, and may be 32 bits.

RESERVED: a reserved field may be 12 bits.

BIFT-id: BIFT-id indicates a BIFT-id to which a BFER group to be notified belongs, and may be 20 bits.

BitString: BitString may be lengthened, and indicates a bit string formed by bit positions of the BFER group to be notified.

The BIER BFD sub-TLV may be carried in a first message flooded by the BFIR based on the ISIS protocol. The first message may be an ISIS Hello message, etc. To be specific, the BIER BFD sub-TLV may be carried in an ISIS Capability type length value (Capability TLV) or other objects in the ISIS Hello message.

Figure 6:
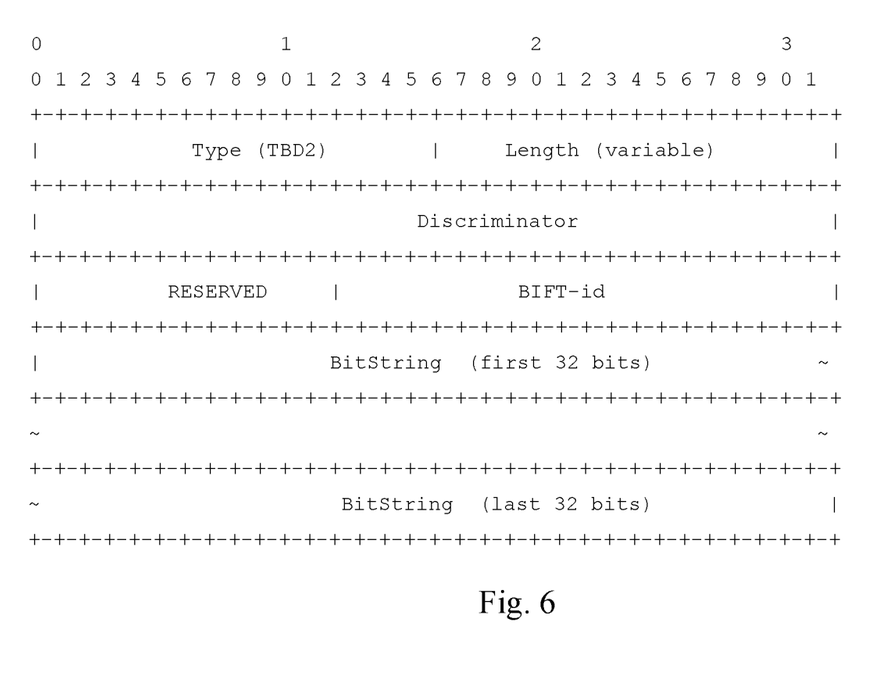
FIG. 6 is another schematic diagram of a format of a BIER BFD sub-TLV provided by an embodiment of the present invention.

An embodiment of the invention extends the OSPF protocol and provides a new BIER BFD sub-TLV used for carrying the BFD information, and a format of the BIER BFD sub-TLV is shown in FIG. 6.

Type: Type may be assigned a value TBD2 indicating that the TLV is a BIER BFD sub-TLV of the OSPF protocol, and may be 16 bits.

Length: Length indicates a length of the TLV, and may be 16 bits.

Discriminator: Discriminator indicates a globally unique discriminator assigned by a BFIR to a multi-point path, and may be 32 bits.

RESERVED: a reserved field may be 12 bits.

BIFT-id: BIFT-id indicates a BIFT-id to which a BFER group to be notified belongs, and may be 20 bits.

BitString: BitString may be lengthened, and indicates a bit string formed by bit positions of the BFER group to be notified.

The BIER BFD sub-TLV may be carried in a second message flooded by the BFIR based on the OSPF protocol. The second message may be an OSPF Hello message, etc. To be specific, the BIER BFD sub-TLV may be carried in a Router Information Link State Advertisement (LSA) or other objects in the OSPF Hello message.

Based on the BIER domain shown in FIG. 1, an embodiment of the present invention provides another method of establishing a BFD session based on BIER. In this embodiment, parameters of the BIER domain are configured as: BIFT-id=1, a bit position (BP) of a BFIR1 is 1, a BP of a BFIR2 is 2, BPs of three BFRs are 3, 4 and 5 respectively, a BP of a BFER1 is 6, and a BP of a BFER2 is 7. The BFIR1 transmits a multicast service to the BFER1 and the BFER2 through the BIER domain.

Figure 7:
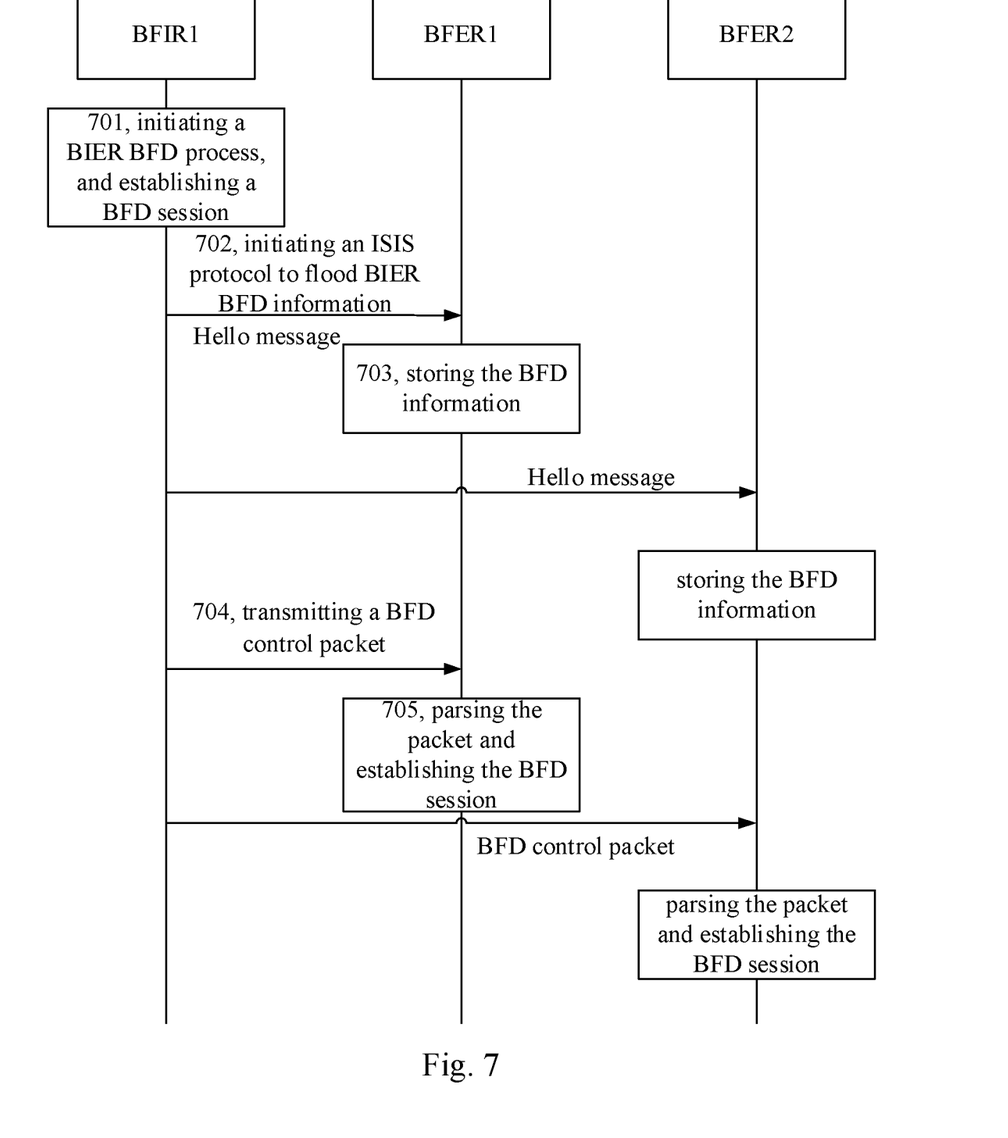
FIG. 7 is another flowchart of a method of establishing a BFD session based on BIER provided by an embodiment of the present invention.

As shown in FIG. 7, the method includes the followings.

In step 701, the BFIR1 node initiates a BIER BFD process to establish a BFD session.

A type of the session is MultipointHead, an establishment mode is set to an on-demand mode, and a role is set to an active mode.

In step 702, the BFIR1 node initiates an ISIS protocol to flood BIER BFD information.

To be specific, an ISIS Capability TLV may be carried in an ISIS Hello message, and a BIER BFD sub-TLV may be carried in the ISIS Capability TLV. Parameters carried in the BIER BFD sub-TLV include: Discriminator=1 of the BFIR1 node, and BIFT-id=1 and BitString=00000110, to which the BFER1 and BFER2 nodes to be notified belong.

In step 703, after receiving the flooded message, the BFER1 and BFER2 nodes store the BFD information.

In step 704, the BFIR1 node transmits a BFD control packet to the BFER1 and BFER2 nodes.

The control packet carries a globally unique discriminator assigned by the BFIR to a multi-point path.

In step 705, after receiving the BFD control packet, the BFER1 and BFER2 nodes parse the packet and establish BFD sessions corresponding to the BFIR1.

The types of the sessions are MultipointTail, the establishment mode is set to an asynchronous mode, and the role is set to a passive mode. The establishments of the BIER BFD sessions are completed.

According to the technical scheme provided in this embodiment, the ISIS protocol is used to notify the BIER BFD information to realize the establishments of the BIER BFD sessions, thereby realizing BFD of the BIER.

Based on the BIER domain shown in FIG. 1, another embodiment of the present invention provides a method of establishing a BFD session based on BIER. In this embodiment, parameters of the BIER domain are configured as: BIFT-id=1, a bit position (BP) of a BFIR1 is 1, a BP of a BFIR2 is 2, BPs of three BFRs are 3, 4 and 5 respectively, a BP of a BFER1 is 6, and a BP of a BFER2 is 7. The BFIR1 transmits a multicast service to the BFER1 and the BFER2 through the BIER domain.

Figure 8:
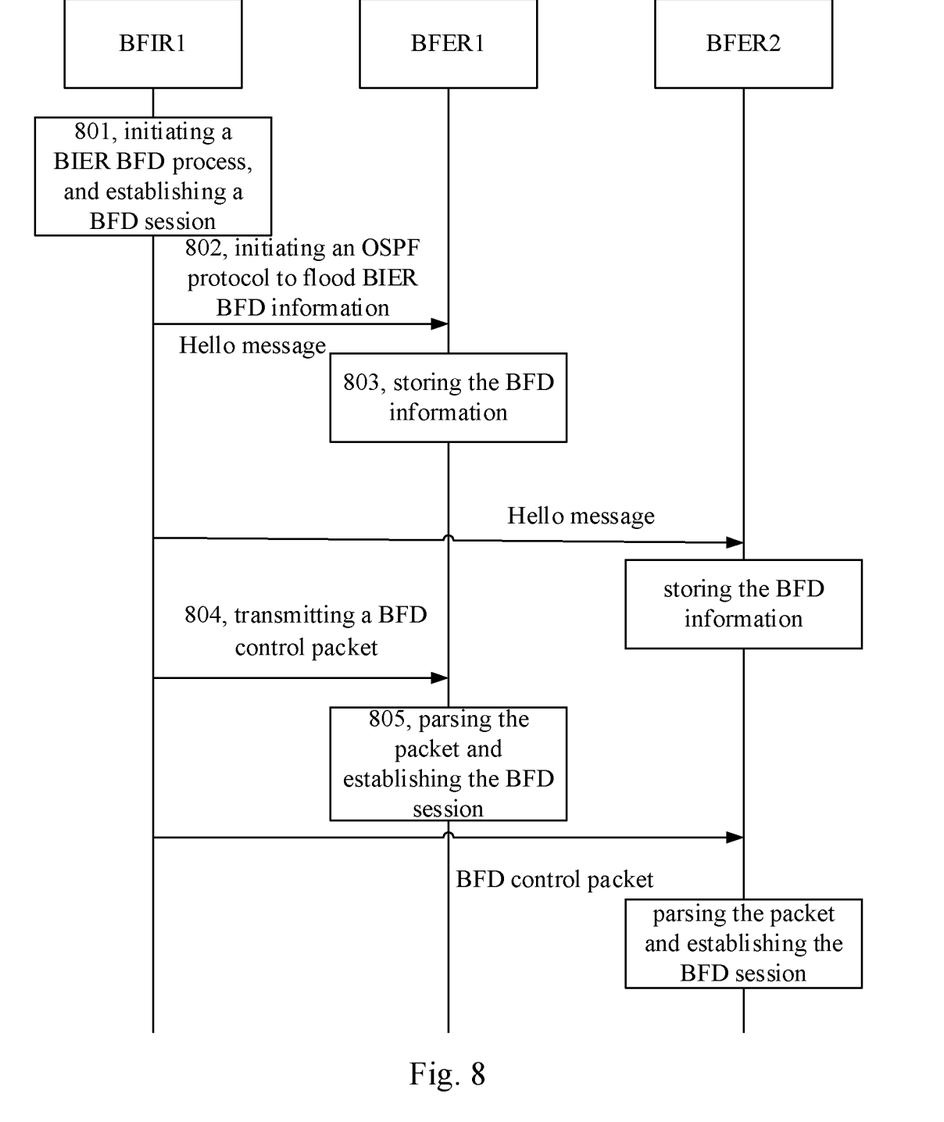
FIG. 8 is another flowchart of a method of establishing a BFD session based on BIER provided by an embodiment of the present invention.

As shown in FIG. 8, the method includes the followings.

In step 801, the BFIR1 node initiates a BIER BFD process to establish a BFD session.

A type of the session is MultipointHead, an establishment mode is set to an on-demand mode, and a role is set to an active mode.

In step 802, the BFIR1 node initiates an OSPF protocol to flood BIER BFD information.

To be specific, a Router Information LSA may be carried in an OSPF Hello message, and a BIER BFD sub-TLV may be carried in the Router Information LSA. Parameters carried in the BIER BFD sub-TLV include: Discriminator=1 of the BFIR1 node, and BIFT-id=1 and BitString=00000110, to which the BFER1 and BFER2 nodes to be notified belong.

In step 803, after receiving the flooded message, the BFER1 and BFER2 nodes store the BFD information.

In step 804, the BFIR1 node transmits a BFD control packet to the BFER1 and BFER2 nodes.

The control packet carries a globally unique discriminator assigned by the BFIR to a multi-point path.

In step 805, after receiving the BFD control packet, the BFER1 and BFER2 nodes parse the packet and establish BFD sessions corresponding to the BFIR1.

The types of the sessions are MultipointTail, the establishment mode is set to an asynchronous mode, and the role is set to a passive mode. The establishments of the BIER BFD sessions are completed.

According to the technical scheme provided in this embodiment, the OSPF protocol is used to notify the BIER BFD information to realize the establishments of the BIER BFD sessions, thereby realizing BFD of the BIER.

Figure 9:
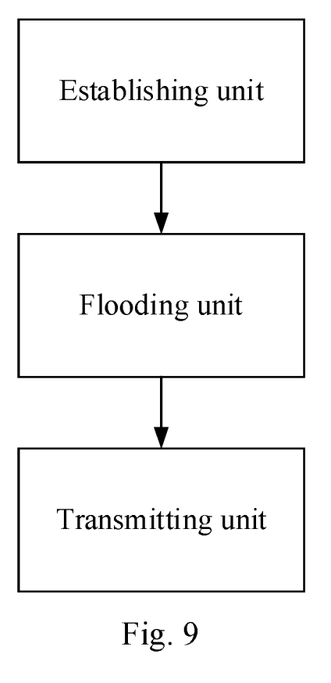
FIG. 9 is a structural diagram of a BFIR provided by an embodiment of the present invention.

An embodiment of the present invention provides a BFIR, as shown in FIG. 9, including the followings.

An establishing unit, used for establishing a BFD session.

A flooding unit, used for flooding BFD information to a BFER group based on an IGP.

A transmitting unit, used for transmitting a BFD control packet to a BFER, to trigger the BFER to establish the BFD session corresponding to the BFIR.

The BFD information includes: a globally unique discriminator assigned by the BFIR to a multi-point path, and a BIFT-id and a bit string to which the BFER group belongs.

The BFER group is one or more BFER nodes corresponding to the BIFT-id and the bit string in the BFD information.

The IGP includes one of an ISIS protocol, and an OSPF protocol.

The flooding unit is specifically used for, when the IGP is the ISIS protocol, carrying the BFD information in a flooded message based on the ISIS protocol.

The flooded message is an ISIS Hello message, the ISIS Hello message carries a BIER BFD sub-TLV, and the BIER BFD sub-TLV carries the BFD information.

The flooding unit is specifically used for, when the IGP is the OSPF protocol, carrying the BFD information in the flooded message based on the OSPF protocol.

The flooded message is an OSPF Hello message, the OSPF Hello message carries the BIER BFD sub-TLV, and the BIER BFD sub-TLV carries the BFD information.

The BIER BFD sub-TLV includes: a Discriminator field, used for representing the globally unique discriminator assigned by the BFIR to the multi-point path; a BIFT-id field, used for representing the BIFT-id to which the BFER group belongs; and a BitString field, used for representing the bit string formed by bit positions of the BFER group.

The BFD control packet carries node information of the BFIR and the globally unique discriminator assigned by the BFIR to the multi-point path.

Figure 10:
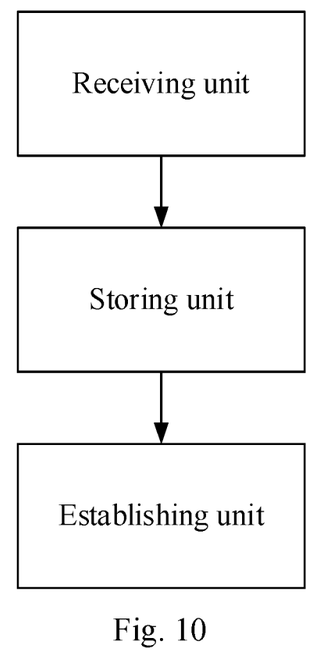
FIG. 10 is a structural diagram of a BFER provided by an embodiment of the present invention.

An embodiment of the present invention provides a BFER, as shown in FIG. 10, including the followings.

A receiving unit, used for receiving BFD information flooded by a BFIR based on an IGP.

A storing unit, used for storing the BFD information.

An establishing unit, used for establishing a BFD session corresponding to the BFIR according to a BFD control packet and the BFD information, after receiving the BFD control packet transmitted by the BFIR.

The BFD information includes a globally unique discriminator assigned by the BFIR to a multi-point path, and a BIFT-id and a bit string to which a BFER group belongs.

The storing unit is specifically used for, when the BFER determines that itself is a BFER node corresponding to the BIFT-id and the bit string in the BFD information, storing the BFD information.

The IGP includes one of an ISIS protocol, and an OSPF protocol.

The receiving unit is specifically used for, when the IGP is the ISIS protocol, receiving the BFD information carried by the BFIR in a flooded message based on the ISIS protocol.

The flooded message is an ISIS Hello message, the ISIS Hello message carries a BIER BFD sub-TLV, and the BIER BFD sub-TLV carries the BFD information.

The receiving unit is specifically used for, when the IGP is the OSPF protocol, receiving the BFD information carried by the BFIR in the flooded message based on the OSPF protocol.

The flooded message is an OSPF Hello message, the OSPF Hello message carries the BIER BFD sub-TLV, and the BIER BFD sub-TLV carries the BFD information.

The BIER BFD sub-TLV includes: a Discriminator field, used for representing the globally unique discriminator assigned by the BFIR to the multi-point path; a BIFT-id field, used for representing the BIFT-id to which the BFER group belongs; and a BitString field, used for representing the bit string formed by bit positions of the BFER group.

The BFD control packet carries node information of the BFIR and the globally unique discriminator assigned by the BFIR to the multi-point path.

The establishing unit is specifically used for parsing the BFD control packet after receiving the BFD control packet; and when the node information of the BFIR and the discriminator carried in the BFD control packet are consistent with the stored BFD information, establishing the BFD session corresponding to the BFER node.

Figure 11:
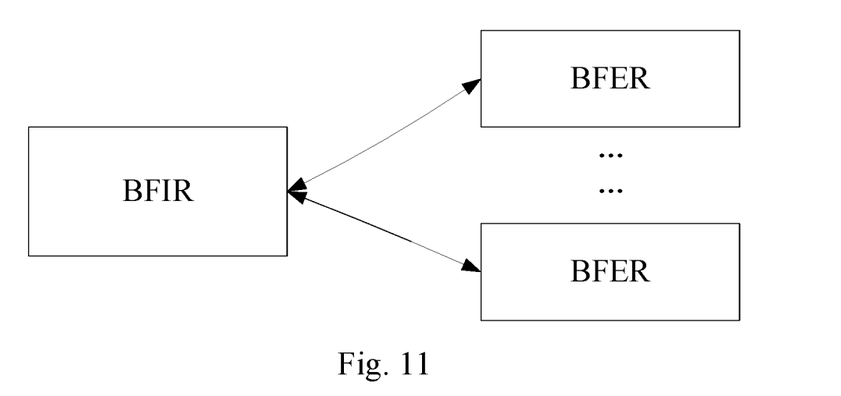
FIG. 11 is a structural diagram of a system of establishing a BFD session based on BIER provided by an embodiment of the present invention.

An embodiment of the present invention provides a system of establishing a BFD session based on BIER, as shown in FIG. 11.

The system includes: a BFIR and a BFER.

The BIER is used for establishing the BFD session, flooding BFD information to a BFER group based on an IGP, and transmitting a BFD control packet to the BFER.

The BFER is used for receiving the BFD information flooded by the BFIR based on the IGP, storing the BFD information, and establishing the BFD session corresponding to the BFIR according to the BFD control packet and the BFD information, after receiving the BFD control packet transmitted by the BFIR.

An embodiment of the present invention further provides a BFIR, including a memory, a processor and a computer program stored on the memory and capable of being executed by the processor. When the computer program is executed by the processor, any one of the above-mentioned methods of establishing the BFD session executed by the BFIR is realized.

An embodiment of the present invention further provides a BFER, including a memory, a processor and a computer program stored on the memory and capable of being executed by the processor. When the computer program is executed by the processor, any one of the above-mentioned methods of establishing the BFD session executed by the BFER is realized.

An embodiment of the present invention further provides a computer-readable storage medium storing an information processing program thereon. When the information processing program is executed by a processor, steps of any one of the above-mentioned methods of establishing the BFD session are realized.

It should be understood by those having ordinary skill in the art that all or some of the steps in the method disclosed above, and functional modules/units in systems and devices may be implemented as software, firmware, hardware, or suitable combinations thereof. If implemented as hardware, divisions among the functional modules/units stated above do not necessarily correspond to divisions of physical components. For example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those having ordinary skill in the art, the term "computer storage media" includes volatile/nonvolatile and removable/non-removable media used in any method or technology for storing information (such as computer-readable instructions, data structures, program modules and other data). The computer storage media include, but are not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a digital versatile disk (DVD) or other optical discs, a magnetic cassette, a magnetic tape, a magnetic disk or other magnetic storage devices, or any other media which can be used to store the desired information and can be accessed by a computer. In addition, it is well known by those having ordinary skill in the art that the communication media generally include computer-readable instructions, data structures, program modules or other data in a modulated data signal, such as a carrier wave or other transmission mechanism, and may include any information delivery media.

The invention claimed is:

1. A method of establishing a bidirectional forwarding detection (BFD) session based on bit index explicit replication (BIER), comprising:
   creating, by a bit-forwarding ingress router (BFIR), the BFD session;
   advertising, by the BFIR, BFD information to a bit-forwarding egress router (BFER) group based on an Interior Gateway Protocol (IGP); and sending, by the BFIR, a BFD control packet to the BFER group, to trigger the BFER group to establish the BFD session corresponding to the BFIR, wherein the BFD information comprises: a unique discriminator assigned by the BFIR to a multi-point path, a BIER forwarding table identifier (BIFT-id) and a bit string to which the BFER group belongs.

2. The method according to claim 1, wherein,
the BFER group is at least one BFER node corresponding to the BIFT-id and the bit string in the BFD information.

3. The method according to claim 1, wherein the IGP comprises an Intermediate System to Intermediate System (ISIS) protocol; and
the BFIR advertising the BFD information based on the IGP comprises: carrying, by the BFIR, the BFD information in a flooded message based on the ISIS protocol.

4. The method according to claim 3, wherein,
the flooded message is an Intermediate System to Intermediate System Hello (ISIS Hello) message, the ISIS Hello message carries a BIER BFD sub-type length value (sub-TLV), and the BIER BFD sub-TLV carries the BFD information.

5. The method according to claim 1, wherein the IGP comprises an Open Shortest Path First (OSPF) protocol; and
the BFIR advertising the BFD information based on the IGP comprises: carrying, by the BFIR, the BFD information in a flooded message based on the OSPF protocol.

6. The method according to claim 5, wherein,
the flooded message is an Open Shortest Path First Hello (OSPF Hello) message, the OSPF Hello message carries a BIER BFD sub-TLV, and the BIER BFD sub-TLV carries the BFD information.

7. The method according to claim 6, wherein the BIER BFD sub-TLV comprises:
a Discriminator field, used for representing a globally unique discriminator assigned by the BFIR to a multi-point path;
a BIFT-id field, used for representing a BIFT-id to which the BFER group belongs; and
a BitString field, used for representing a bit string formed by bit positions of the BFER group.

8. The method according to claim 1, wherein,
the BFD control packet carries node information of the BFIR and a globally unique discriminator assigned by the BFIR to a multi-point path.

9. A bit-forwarding ingress router (BFIR), comprising a memory, a processor and a computer program stored on the memory and capable of being executed by the processor; wherein the computer program is executed by the processor, causes the processor to implement the method of establishing the bidirectional forwarding detection session according to claim 1.

10. A non-transitory computer-readable storage medium storing an information processing program, wherein the information processing program is executed by a processor, causes the processor to implement the method of establishing the bidirectional forwarding detection session according to claim 1.

11. A method of establishing a bidirectional forwarding detection (BFD) session based on bit index explicit replication (BIER), comprising:
receiving, by a bit-forwarding egress router (BFER), BFD information advertised by a bit-forwarding ingress router (BFIR) based on an Interior Gateway Protocol (IGP), and storing the BFD information; and
establishing, by the BFER, the BFD session corresponding to the BFIR according to a BFD control packet and the BFD information, after receiving the BFD control packet sent by the BFIR,
wherein the BFD information comprises: a unique discriminator assigned by the BFIR to a multi-point path, a BIER forwarding table identifier (BIFT-id) and a bit string to which the BFER belongs.

12. The method according to claim 11, wherein,
storing the BFD information comprises: storing, by the BFER, the BFD information, in a case of determining that the BFER is a BFER node corresponding to the BIFT-id and the bit string in the BFD information.

13. The method according to claim 11, wherein the IGP comprises an Intermediate System to Intermediate System (ISIS) protocol; and
the BFER receiving the BFD information advertised by the BFIR based on the IGP comprises: receiving, by the BFER, the BFD information carried by the BFIR in a flooded message based on the ISIS protocol.

14. The method according to claim 13, wherein,
the flooded message is an Intermediate System to Intermediate System Hello (ISIS Hello) message, the ISIS Hello message carries a BIER BFD sub-type length value (sub-TLV), and the BIER BFD sub-TLV carries the BFD information.

15. The method according to claim 11, wherein the IGP comprises an Open Shortest Path First (OSPF) protocol; and
the BFER receiving the BFD information advertised by the BFIR based on the IGP comprises: receiving, by the BFER, the BFD information carried by the BFIR in a flooded message based on the OSPF protocol.

16. The method according to claim 15, wherein,
the flooded message is an Open Shortest Path First Hello (OSPF Hello) message, the OSPF Hello message carries a BIER BFD sub-TLV, and the BIER BFD sub-TLV carries the BFD information.

17. The method according to claim 16, wherein the BIER BFD sub-TLV comprises:
a Discriminator field, used for representing a globally unique discriminator assigned by the BFIR to a multi-point path;
a BIFT-id field, used for representing a BIFT-id to which a BFER group belongs; and
a BitString field, used for representing a bit string formed by bit positions of the BFER group.

18. The method according to claim 11, wherein,
the BFD control packet carries node information of the BFIR and a globally unique discriminator assigned by the BFIR to a multi-point path; and
establishing the BFD session corresponding to the BFIR according to the BFD control packet and the BFD information comprises:
a BFER node parsing the BFD control packet after receiving the BFD control packet; and in a case of the node information of the BFIR and the discriminator carried in the BFD control packet being consistent with the stored BFD information, establishing the BFD session corresponding to the BFER node.

19. A bit-forwarding egress router (BFER), comprising a memory, a processor and a computer program stored on the memory and capable of being executed by the processor; wherein the computer program is executed by the processor, causes the processor to implement the method of establishing the bidirectional forwarding detection session according to claim 11.

20. A non-transitory computer-readable storage medium storing an information processing program, wherein the information processing program is executed by a processor, causes the processor to implement the method of establishing the bidirectional forwarding detection session according to claim 11.

* * * * *